United States Patent
Johnson, Jr. et al.

(10) Patent No.: US 8,745,579 B2
(45) Date of Patent: Jun. 3, 2014

(54) METHODS AND SYSTEMS FOR DYNAMICALLY COMPOSING DISTRIBUTED INTERACTIVE APPLICATIONS FROM HIGH-LEVEL PROGRAMMING LANGUAGES

(75) Inventors: H. Bruce Johnson, Jr., Decatur, GA (US); Joel Webber, Decatur, GA (US)

(73) Assignee: Google Inc., Mountain View, CA (US)

( * ) Notice: Subject to any disclaimer, the term of this patent is extended or adjusted under 35 U.S.C. 154(b) by 84 days.

(21) Appl. No.: 13/282,293

(22) Filed: Oct. 26, 2011

(65) Prior Publication Data
US 2012/0041935 A1    Feb. 16, 2012

Related U.S. Application Data

(63) Continuation of application No. 11/568,353, filed as application No. PCT/US2005/014215 on Apr. 26, 2005, now abandoned.

(60) Provisional application No. 60/666,116, filed on Mar. 29, 2005.

(51) Int. Cl.
*G06F 9/44*    (2006.01)

(52) U.S. Cl.
USPC .......................... 717/106; 717/120; 717/127

(58) Field of Classification Search
None
See application file for complete search history.

(56) References Cited

U.S. PATENT DOCUMENTS

| | | | |
|---|---|---|---|
| 5,313,616 A * | 5/1994 | Cline et al. | 717/127 |
| 5,349,662 A * | 9/1994 | Johnson et al. | 717/127 |
| 5,553,143 A | 9/1996 | Ross et al. | |
| 5,671,412 A | 9/1997 | Christiano | |
| 5,794,048 A * | 8/1998 | Brady | 717/120 |
| 5,892,904 A | 4/1999 | Atkinson et al. | |
| 6,044,398 A | 3/2000 | Marullo et al. | |
| 6,148,331 A | 11/2000 | Parry | |
| 6,173,446 B1 * | 1/2001 | Khan et al. | 717/127 |
| 6,353,925 B1 | 3/2002 | Stata et al. | |
| 6,490,720 B1 * | 12/2002 | Carlsen et al. | 717/127 |
| 6,510,466 B1 | 1/2003 | Cox et al. | |
| 6,640,240 B1 * | 10/2003 | Hoffman et al. | 709/203 |

(Continued)

FOREIGN PATENT DOCUMENTS

WO    01/92993 A2    12/2001

OTHER PUBLICATIONS

Sai Ho Kwok et al., " Digital Rights Management for Mobile Commerce Using Web Services" Journal of Electronic Commerce Research, 2006, <http://citeseerx.ist.psu.edu/viewdoc/download?doi=10.1.1.83.3185&rep=rep1&type=pdf>, pp. 1-13.*

(Continued)

*Primary Examiner* — Thuy Dao
*Assistant Examiner* — Samuel Hayim
(74) *Attorney, Agent, or Firm* — Birch, Stewart, Kolasch & Birch, LLP.

(57) ABSTRACT

This disclosure provides techniques of verifying license compliance for a web application. A web application including a broadcast key and a license tag is generated. The generated web application is made available for review by a search engine. A query is communicated to the web search engine for a selected license tag. A list of reviewed web applications is received from the web search engine. The broadcast keys associated with each web application are evaluated to identify duplicate broadcast keys.

15 Claims, 8 Drawing Sheets

(56) References Cited

U.S. PATENT DOCUMENTS

| | | | |
|---|---|---|---|
| 6,658,423 B1 | 12/2003 | Pugh et al. | |
| 7,065,507 B2 | 6/2006 | Mohammed et al. | |
| 7,428,530 B2 | 9/2008 | Ramarathnam et al. | |
| 7,500,100 B1 | 3/2009 | Kobozev et al. | |
| 7,685,255 B2 * | 3/2010 | Amlekar et al. | 709/217 |
| 2001/0032310 A1 | 10/2001 | Corella | |
| 2002/0032763 A1 * | 3/2002 | Cox et al. | 709/223 |
| 2002/0046340 A1 | 4/2002 | Fujishiro et al. | |
| 2002/0091991 A1 * | 7/2002 | Castro | 717/106 |
| 2002/0107809 A1 | 8/2002 | Biddle et al. | |
| 2002/0162090 A1 * | 10/2002 | Parnell et al. | 717/120 |
| 2002/0178435 A1 * | 11/2002 | Allison | 717/106 |
| 2002/0184608 A1 * | 12/2002 | Pabla | 717/106 |
| 2003/0005412 A1 * | 1/2003 | Eanes | 717/120 |
| 2003/0028488 A1 | 2/2003 | Mohammed et al. | |
| 2003/0070160 A1 * | 4/2003 | Berstis | 717/120 |
| 2003/0106049 A1 | 6/2003 | Ungar | |
| 2003/0172035 A1 * | 9/2003 | Cronce et al. | 705/59 |
| 2003/0182651 A1 * | 9/2003 | Secrist et al. | 717/120 |
| 2003/0188009 A1 * | 10/2003 | Agarwalla et al. | 709/236 |
| 2003/0188016 A1 * | 10/2003 | Agarwalla et al. | 709/241 |
| 2003/0220880 A1 | 11/2003 | Lao et al. | |
| 2003/0226132 A1 | 12/2003 | Tondreau et al. | |
| 2005/0050319 A1 * | 3/2005 | Suraski | 713/164 |
| 2005/0071630 A1 | 3/2005 | Thornton et al. | |
| 2005/0132060 A1 | 6/2005 | Mo et al. | |
| 2006/0122939 A1 * | 6/2006 | Cohen et al. | 705/59 |
| 2007/0156845 A1 * | 7/2007 | Devanneaux et al. | 709/217 |
| 2007/0250601 A1 * | 10/2007 | Amlekar et al. | 709/219 |

OTHER PUBLICATIONS

Zongkai Yang et al., "Integration of Digital Rights Management into Learning Content Management System", IEEE, 2005, <http://ieeexplore.ieee.org/stamp/stamp.jsp?tp=&arnumber=1428506>, pp. 1-5.*

Alban Gabillon et al., "DRM policies for Web Map Service", ACM, 2008, <http://delivery.acm.org/10.1145/1510000/1503408/p20-gabillon.pdf>, pp. 1-10.*

3 European Search Report for European Patent Application No. 09007984.9-2211 dated Jul. 5, 2011.

* cited by examiner

Handwritten JavaScript Code neatly integrated into Java code via "native"

```
class InternetExplorer6 extends JavascriptBrowser {
    // ... more methods here ...
    public native long createInputRadioElement(String group) /*{
            var elem = parent.document.createElement("<INPUT type='RADIO' name='" +
                    group + "'>");
            return elem;
    }*/;
    public native String iframeGetSrc(long h) /*{
            return h.contentWindow.document.URL;
    }*/;
    // ... more methods here ...
```

*FIG. 6*

METHODS AND SYSTEMS FOR DYNAMICALLY COMPOSING DISTRIBUTED INTERACTIVE APPLICATIONS FROM HIGH-LEVEL PROGRAMMING LANGUAGES

CROSS-REFERENCE TO RELATED APPLICATIONS

This application is a continuation of U.S. application Ser. No. 11/568,353 (filed Oct. 26, 2006 now abandoned and published as US 2008-0022267 A1), which is a National Stage of International Application No. PCT/US05/14215 (filed Apr. 26, 2005 and published as WO 2005/106658), which claims priority from, and the benefit of, U.S. Provisional Application No. 60/666,116 (filed Mar. 29, 2005 and now expired). Each patent application identified above is incorporated by reference in its entirety to provide continuity of disclosure.

BACKGROUND

The present application is directed to a method and system for dynamic composition of distributed interactive applications from high-level programming languages. The Internet is a global network of connected computer networks. Over the last decade, the Internet has grown in significant measure. A large number of computers on the Internet provide information in various forms. Anyone with a computer connected to the Internet can potentially tap into this vast pool of information.

The information available via the Internet encompasses information available via a variety of types of application layer information servers such as SMTP (simple mail transfer protocol), POP3 (Post Office Protocol), GOPHER (RFC 1436), WAIS, HTTP (Hypertext Transfer Protocol, RFC 2616) and FTP (file transfer protocol, RFC 1123).

One of the most wide spread methods of providing information over the Internet is via the World Wide Web (the Web). The Web consists of a subset of the computers connected to the Internet; the computers in this subset run Hypertext Transfer Protocol (HTTP) servers (Web servers). Several extensions and modifications to HTTP have been proposed including, for example, an extension framework (RFC 2774) and authentication (RFC 2617). Information on the Internet can be accessed through the use of a Uniform Resource Identifier (URI, RFC 2396). A URI uniquely specifies the location of a particular piece of information on the Internet. A URI will typically be composed of several components. The first component typically designates the protocol by which the address piece of information is accessed (e.g., HTTP, GOPHER, etc.). This first component is separated from the remainder of the URI by a colon (':'). The remainder of the URI will depend upon the protocol component. Typically, the remainder designates a computer on the Internet by name, or by IP number, as well as a more specific designation of the location of the resource on the designated computer.

The term URI includes Uniform Resource Names (URN's) including URN's as defined according to RFC 2141.

Web servers host information in the form of Web pages; collectively the server and the information hosted are referred to as a Web site. A significant number of Web pages are encoded using the Hypertext Markup Language (HTML) although other encodings using SGML, eXtensible Markup Language (XML), DHMTL or XHTML are possible. The published specifications for these languages are incorporated by reference herein; such specifications are available from the World Wide Web Consortium and its Web site. Web pages in these formatting languages may include links to other Web pages on the same Web site or another. As will be known to those skilled in the art, Web pages may be generated dynamically by a server by integrating a variety of elements into a formatted page prior to transmission to a Web client. Web servers, and information servers of other types, await requests for the information from Internet clients.

Client software has evolved that allows users of computers connected to the Internet to access this information. Advanced clients such as Netscape's Navigator and Microsoft's Internet Explorer allow users to access software provided via a variety of information servers in a unified client environment. Typically, such client software is referred to as browser software.

Many of these browsers include an ability to perform interpretative execution of scripted applications downloaded from a server. The systems and methods described herein support rapid development and deployment of applications for use in Web browsers.

SUMMARY

In some embodiments, a method is provided for verifying license compliance for a web application. The method includes generating a web application including a broadcast key and a license tag. The method includes making the generated web application available for review by a web search engine. The method includes communicating a query to the web search engine for a selected license tag. The method includes receiving a list of reviewed web applications from the web search engine. The method includes evaluating the broadcast keys associated with each web application in the list of reviewed web applications to identify duplicate broadcast keys.

In some embodiments, at least one computer readable non-transitory medium stores instructions that, when executed by a computer, cause the computer to execute the disclosed method.

In some embodiments, a system is provided for verifying license compliance for a web application. The system includes a data store to store a broadcast key and a license tag associated with a web application. The system includes a communication interface to support communication with a search engine. The system includes a processor to communicate a query for a selected license tag to a selected search engine via the communication interface. The processor is to receive results from the communicated query. The processor is to generate a list of reviewed web pages based upon the received results. Each reviewed web page includes a selected web application with the selected license tag. The processor is to evaluate broadcast keys associated with the reviewed web pages to identify duplicate broadcast keys. The processor is to report duplicate broadcast keys among the reviewed web pages.

Additional advantages will be set forth in part in the description which follows, and in part will be obvious from the description, or may be learned by practice of the invention. The advantages of the disclosed systems and methods will be realized and attained by means of the elements and combinations particularly pointed out herein. It is to be understood that both the general description and the detailed description are exemplary and explanatory only and are not restrictive of the invention.

BRIEF DESCRIPTION OF THE DRAWINGS

FIG. 6 displays an example incorporation of native code in the target language of the composed interactive program embedded within the input program.

DETAILED DESCRIPTION

Figure 1:
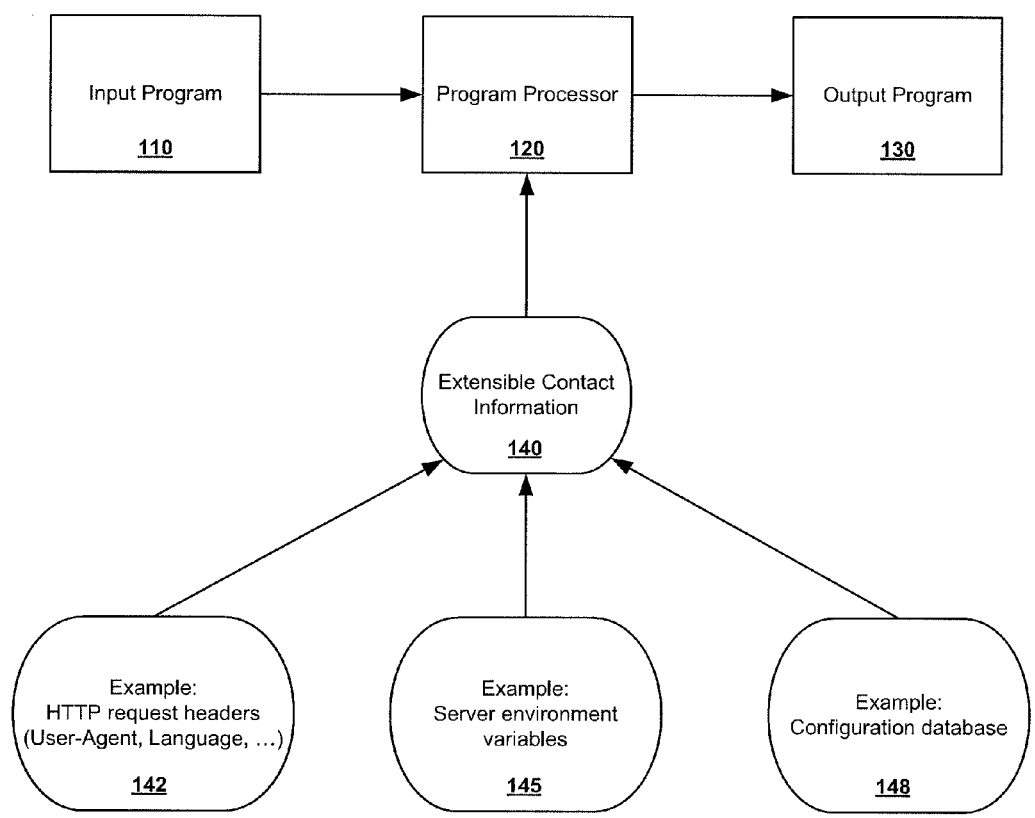
FIG. 1 displays an abstract overview of dynamic composition of an interactive program from an input program.

As shown in FIG. 1, a typical process consumes a program description ("input program") 110 and, by optionally accounting for a variety of situational factors ("context") 140, produces 140 an enhanced derived output program ("output program") 130. Input programs, and consequently the associated output programs, are general-purpose in nature and need not be oriented toward any particular industry- or domain-specific concepts.

Figure 2:
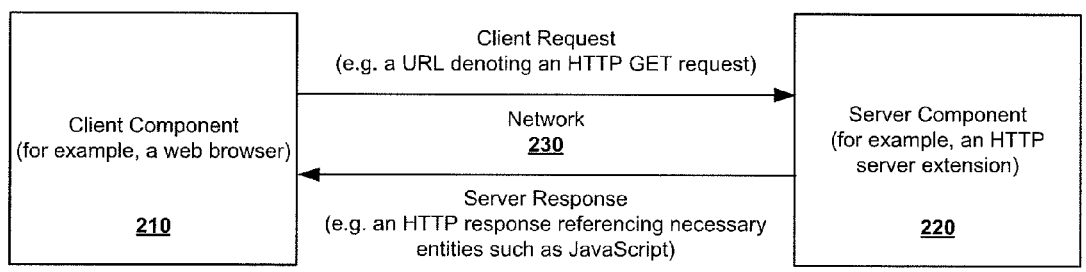
FIG. 2 represents a typical environment capable of implementing the present systems and methods.

With reference to FIG. 2, a typical implementation of the methods described herein includes one or more server components (e.g., 210) that process the input program to produce the output program in response to requests by one or more client components (e.g., 220). Both client and server components would typically be implemented as software modules capable of interacting over a suitable communication channel according to an appropriate communication protocol. The communication channel is preferably a computer network 230 according to an appropriate networking protocol such as TCP/IP or higher-level protocols such as HTTP. Server components would typically be designed either as standalone processes (for example, an HTTP server) or as plug-ins for other host processes (for example, extensible HTTP servers such as Microsoft IIS or Apache httpd). Client components would typically be designed as applications capable of being redirected by their users to arbitrary logical network locations. A well-known example of such a client component is a web browser that allows its user to specify a network location via a URL and which sends and receives information using the HTTP protocol. Other examples of appropriate client components include Java WebStart, a networked application "launcher."

The described system does not dictate the specific form of the input program. Any unambiguous expression of an author's intent in a computer-readable form is a potentially valid input program, including but not limited to program descriptions expressed using imperative programming languages such as the Java, C, C++, C#, or JavaScript languages, declarative programming languages such as the Prolog language or structured specifications as might be expressed with an XML-based schema, functional programming languages such as the Haskell or LISP languages, any other method for expressing the behavior of software that can be parsed and analyzed programmatically, or any combination of the foregoing. A typical implementation of the methods described herein consumes input programs written as source code in the Java programming language, because of its popularity.

Implementations of the described system that support certain choices of programming languages for developing input programs may offer additional benefits if the input program can be analyzed and manipulated by tools via suitable preprocessing steps. For example, an implementation whose input programs are written in the Java language benefit from the existence of a universe of Java tools such as development environments, debuggers, profilers, code coverage analysis tools, unit testing tools and so on. This is relevant to the system described herein because even when the output program is not amenable to tools (or such tools are unavailable) to the same extent as the input program, the output program essentially captures the benefits of the input program being amenable to such tools. Continuing with the previous example, if input programs are written in, for example, the Java language and output programs are generated in the JavaScript language, the deficit of useful JavaScript tools is overcome by the combined facts that (1) the author of the input program is working in the Java language, which does have many useful and applicable tools and (2) the system and methods described herein ensure that output programs are essentially equivalent in functionality to the input program. In other words, the author is only concerned with the input program (the one to which good tools can be applied); the system ensures that the output program "just works." If input programs are written in the Java language, for example, it is possible to introduce a concept such as "hosted mode" in which software developers can edit, run, test and debug their input programs in a completely Java-centric environment, then later create output programs in a completely different language (for example, JavaScript). The effect is that developers can work in the very productive "hosted mode" development environment without concern for the language or format of the ultimate output program.

The described system may use an open-ended set of context information during the production of the output program, thereby influencing how the methods of translation impart form, structure, behavior, and other attributes to the output program. Context information that may influence the translation process may include, without limitation, (1) data specified implicitly by the requesting client (for example, in a typical implementation using the HTTP protocol the client might automatically send information about its stored "cookies" and other standard HTTP request headers such as its "User-Agent" designation"), (2) data specified explicitly by the requesting client (for example, in an HTTP-based implementation the client would send a query string from a user-supplied URL, explicit HTTP request headers, and other data resulting from program execution within the client), (3) data implicitly available to server components regarding their execution environment (for example, using the operating system idiom of "environment variables" or application programming interfaces provided by the operating system that describe the hardware and software configuration of the server component's host platform such as cultural and localization settings, system date, system time and other settings), and (4) data explicitly available to server components as specified by the author or publisher of software via the described system (for example, specifying values for Java system properties).

The described system need not dictate availability of any particular types of context information, but instead may be implemented to be extensible by "context plug-ins" so that new sources of context information can be made available by adding to, rather than modifying, the system. A typical implementation could use established mechanisms for dynamically loading code, including but not limited to designated Java classes, dynamic link libraries (DLLs), shared object code, and similar facilities for runtime loading of code. Designating which context plug-ins are used in a particular deployment of a system may be a reconfigurable choice, and the set of context plug-ins need be neither fixed nor implied by the server component in any way. A typical implementation might store such information in a suitable data store such as database or structured file.

The output program can be produced at an arbitrary time relative to when the output program is needed by a client. A typical implementation could provide the ability to produce the output program ahead of time (that is, before a client requests it), making it possible to produce pre-computed versions of the output program, allowing its user to assert at least some context information for which the output program should be created, including the ability to specify a URL query string, arbitrary HTTP request headers, and other system properties that can influence the production of the output program. This ability to pre-compute output programs is beneficial when there are many output program variations and the delay due to processing on-the-fly is undesirable.

The described system instead, or in addition, could have the ability to delay production of output programs until a client actually requests a program. The ability to produce the output program on-the-fly enables usage scenarios in which even the timeframe of the request can affect the output program produced. For example, if the output program is designed to include generated code whose content is based on the current state of data in a database, the system's ability to wait until a request is actually made (as opposed to producing the output program ahead of time without regard to the timing of the request) allows production of the most up-to-date output program possible. A typical implementation may support on-the-fly production of output programs by insinuating itself into the process of fulfilling HTTP requests.

Figure 3:
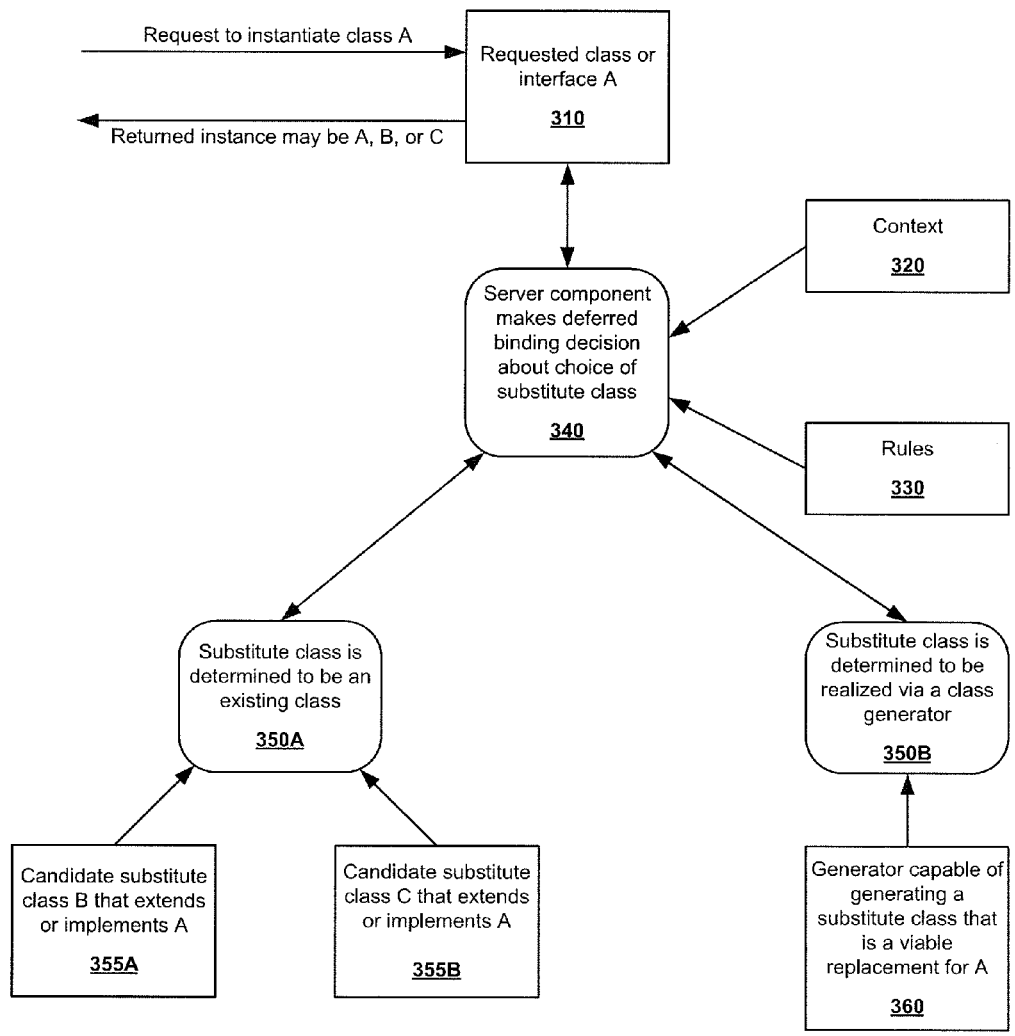
FIG. 3 depicts an exemplary process for deferred binding.

For input programs written in a statically typed object-oriented programming language such as the Java language, a preferred method of accounting for context when producing the output program is termed "deferred binding" as depicted in FIG. 3, wherein the server component transparently replaces a request to instantiate one class or interface 310- (with said request possibly being made indirectly via a "factory" method, as appropriate for the semantics of the input language) with a request to instantiate another class that is a compatible alternative such that the requesting code need not be aware of the substitution by virtue of polymorphism or a similar abstraction mechanism. The choice of which class to substitute for the requested class or interface (the "deferred binding decision") is a function of both the context 320 at the time of the program request as well as a set of rules 330.

A typical implementation of a deferred binding configuration consists of a set of criteria, a set of contexts 320, and a set of rules 330. The class or interface being instantiated that is subject to deferred binding is referred to as the "requested class" or the "requested interface," respectively. Subsequent references to a "requested class" should be understood to also mean "requested class or interface." The result of a deferred binding decision 340 is the name of a class that should be substituted for the requested class (the "substitute class") (e.g., 350A, 350B).

A criterion can be expressed as any compatible Java class, referred to in the configuration by its fully-qualified name (e.g. "com.innuvo.dcs.server.criteria.UserLanguage"). Criteria are used as "decision axes" on which deferred binding decisions can be made. Similarly, a context plug-in can be expressed as any compatible Java class, referred to in the configuration by its fully-qualified name (e.g. "com.innuvo.dcs.server.contexts.HttpRequestContext"). Contexts are used to fetch and normalize values associated with criteria so that criteria values can be referred to within rules without regard to exactly where they originate.

For each criterion, the configuration specifies which context supplies its request value. A "request value" is a string value associated with a particular criterion. Each unique application request can have a different set of request values. However, for the duration of any particular request, a request value is typically unchanging once supplied by a context.

Typically, each deferred binding rule has (1) a matching behavior that determines how strongly it should be considered as a candidate for the one "deciding rule" to make the deferred binding decision and (2) a collection of actions, at most one of which is to be invoked if its containing rule is selected as the deciding rule. The following rule matching behaviors are typical, although additional behaviors could be added: (1) a "class-is" rule applies when the requested class is a particular specified class; (2) an "interface-is" rule applies when a requested interface is a particular specified interface; (3) a "class-extends" rule applies when the input class directly or indirectly extends a specified class; (4) an "interface-extends" rule applies when the requested interface directly or indirectly extends the specified interface; and (5) a "class-implements" rule applies when the requested class directly or indirectly implements a specified interface. In the preferred implementation, the deciding rule is chosen by computing a score for every rule based on how specifically the rule matches the requested class. The rule receiving the highest score and thus being the most specific is chosen as the deciding rule. It is also possible that no rule applies, in which case an implementation would typically instantiate the requested class itself without substitution.

Each action has a set of conditions that can be matched to evaluate how well the action fits the current request. Each condition specifies a criterion and a match value. A match value is compared against a corresponding request value having the same criterion and is used to test whether or not a condition is met. A match value can be an exact string to match (for example, "en") or the wildcard value ("*"), which matches any request value.

After a deciding rule is chosen, one of its actions is invoked. The invoked action ultimately "realizes" a substitute class that is then instantiated and returned in lieu of the requested class. Realizing a substitute class means that code can be executed in the process of determining the name and/or the content of the substitute class; this code can, for example, generate the substitute class from scratch during the deferred binding operation.

The following types of actions are typical, although many types of actions could be added: (1) a "replace-with" action (e.g., 355A, 355B) that realizes the substitute class trivially by returning a particular class name that is always the same and which is assumed to already exist and (2) a "generate-using" action (e.g., 360) that realizes the substitute class dynamically by delegating to a specific generator the decision of which class is chosen.

A deferred binding "generator" can be expressed as any compatible Java class, referred to in the configuration by its fully-qualified name (e.g. "com.innuvo.dcs.server.generators.StringClassGenerator"). A generator would typically be invoked when performing a "generate-using" action. Generators execute arbitrary code to complete the deferred binding operation. For example, a generator may (1) programmatically compute the name of the substitute class, (2) gather data from the request or from other data sources, (3) ensure that the substitute class is up-to-date, (4) create the source code for the substitute class if it does not exist, or (5) perform combinations of the preceding or other actions to determine and realize the substitute class.

A typical algorithm for deferred binding follows. Requested interfaces and their related rule match behaviors are not shown explicitly, although they could be easily introduced into the rule selection algorithm.

1. Let class A be the requested class.
2. Search the deferred binding rules for the most appropriate rule R to apply to A:
   2.1. If there is a "class-is" rule specifying A, then that rule is chosen as R.
   2.2. If R has not been decided, consider each "class-extends-X" rule, where X names a Java class that A directly or indirectly extends. Of these rules, if any, the one specifying an X that is the nearest ancestor of A is chosen as R.
   2.3 If R has not been decided, consider each "class-implements-Y" rule, where Y names a Java interface that A directly or indirectly implements. Of these rules, if any, the one implemented by A or A's nearest superclass is chosen as R.
3. If no rule applies, the output class is A. The operation terminates here. In this case, no substitution occurs.
4. Score each action to find the best action T:
   4.1. Let T be initially undefined.
   4.2. Assume the highest score is −1.
   4.3. For each action K of rule R, compute a test score (initially 0) as follows:
      4.3.1. For each condition D of K, adjust the test score as follows:
         4.3.1.1. Let U be D's criterion.
         4.3.1.2. Let V be D's match value.
         4.3.1.3. Let W be the request value for the criterion U. If the request value for criterion U is undefined, first invoke the context responsible for it so that it becomes defined.
         4.3.1.4. If V is exactly equal to W, then increment the test score for K by one.
         Otherwise, if V is the wildcard match value "*", do not adjust the test score of K.
         4.3.1.5. Otherwise, V and W are mismatches and K is removed from consideration as a candidate for T.
      4.3.2. If K is still a candidate for T and its test score is greater than the highest score, K becomes T because it is the best known action (its permanent status as T is pending the examination of other actions that may have higher test scores). Record the highest score as being K's test score.
   4.4. If no best action T was found, the output class is A. The operation terminates here. In this case, no substitution occurs.
   4.5. Determine the substitute class by performing the action T. If T is defined, then realize the output class by performing the action denoted by T. This may involve executing code designated by T. The operation terminates here. In this case, a substitution may occur if the output class realized by T is a class other than A.

Figure 4:
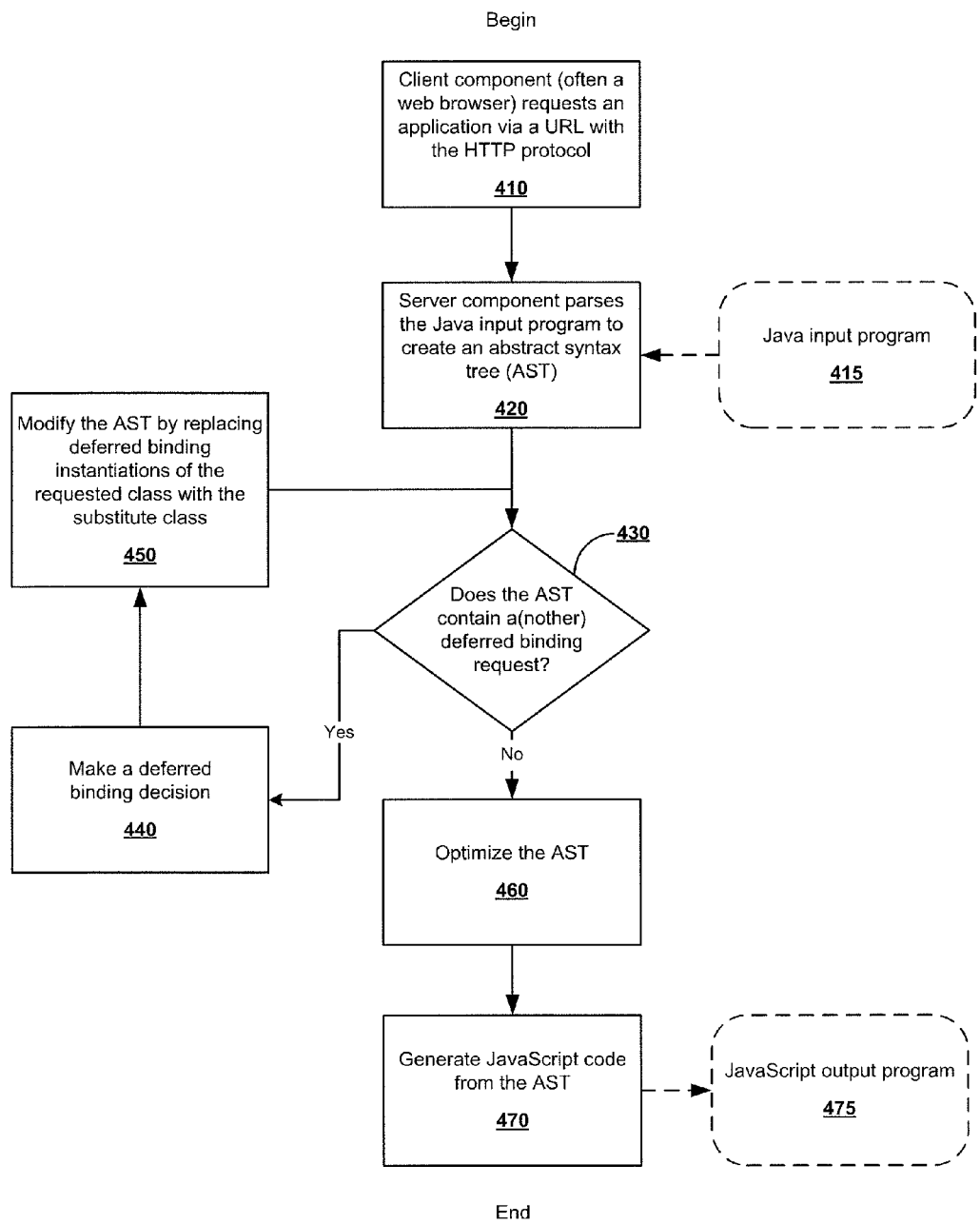
FIG. 4 is a process diagram displaying steps in an interactive application generation.

FIG. 4 depicts an example implementation of the described system that is oriented toward creating interactive web applications. An end user's client component (e.g., Web browser) requests a particular application in step 410. The server component receives the request and recognizes that an interactive web application should be generated. In step 420, the server component parses the high level input program such as Java input program 415 into an abstract syntax tree (AST). A determination is then made as to whether the AST has any remaining deferred binding requests in step 430. If so, a deferred binding decision occurs in step 440; a particular exemplary deferred binding decision process is depicted in FIG. 3. The AST is then updated in step 450 based upon the deferred binding decision and the process continues with a further decision at step 430. Once no further unserviced deferred binding requests remain in the AST, the AST is optimized in step 460. In step 470, JavaScript code (the requested interactive web application) 475 is generated from the optimized AST.

Input programs can be written in the Java language and output programs are produced by compiling the input program into the JavaScript language. This implementation can be thought of as a "request-time compiler," several benefits of which stem at least in part from the confluence of two aspects of the system's design. (1) Delaying compilation until a request is made allows information about the requester to be included in deferred binding decisions. This is beneficial because it provides, among other benefits, an opportunity to conditionally include subsets of the input program that are relevant to the requester while excluding subsets of the input program that are not relevant. (2) Deferred binding substitutions can occur during compilation rather than when the output program is already running (as is the case with traditional "factory pattern" implementations in the prior art), allowing the compiler's analysis, optimization, and code generation phases to take the exact type of substitute classes into account, as opposed to being forced to treat them polymorphically. Deferred binding instantiations can be treated "as if the developer had chosen the substitute class in the first place."

As one example of why request-time compilation is valuable, consider that the web browser's "User-Agent" identifier can inform deferred binding decisions such that only code appropriate for the requesting web browser need be included in the output program. A variety of benefits result, including: (1) unneeded code (for example, code to support user agents other than the requester) is not reflected in the output program, thus reducing its size, improving its download time, and decreasing its memory consumption; (2) the compiler's optimizer can thoroughly analyze the program using knowledge of the exact types of substitute classes, providing a wealth of information for optimizing the output program in terms of size, speed or combinations thereof (including but not limited to method inlining, dead code elimination, loop unrolling, and other compiler optimizations); and (3) the deferred binding mechanism provides a structured and efficient way to "fork" code that is external to the input program, thus sparing the input program from scattering "if-then-else" tests throughout to achieve code forking—such tests would otherwise be burdensome in terms of size, runtime speed, and maintainability.

An implementation may also choose to add the additional restriction that no code may be dynamically loaded in the output program as it runs, allowing the optimizer to perform deep global optimizations by inferring extra information about the program structure such as identifying classes that are implicitly "final" (to use the Java vocabulary) and whose methods are therefore candidates for inlining and subsequent optimizations.

In a typical implementation, an algorithm such as deferred binding provides an extensible framework for introducing on-demand code generation. FIG. 3 shows an exemplary approach to how a substitute class can be created as needed during the decision process. When substitute classes are generated, the system could typically ensure that context information, including the type of the requested class, is available to inform the code generation process.

Figure 5:
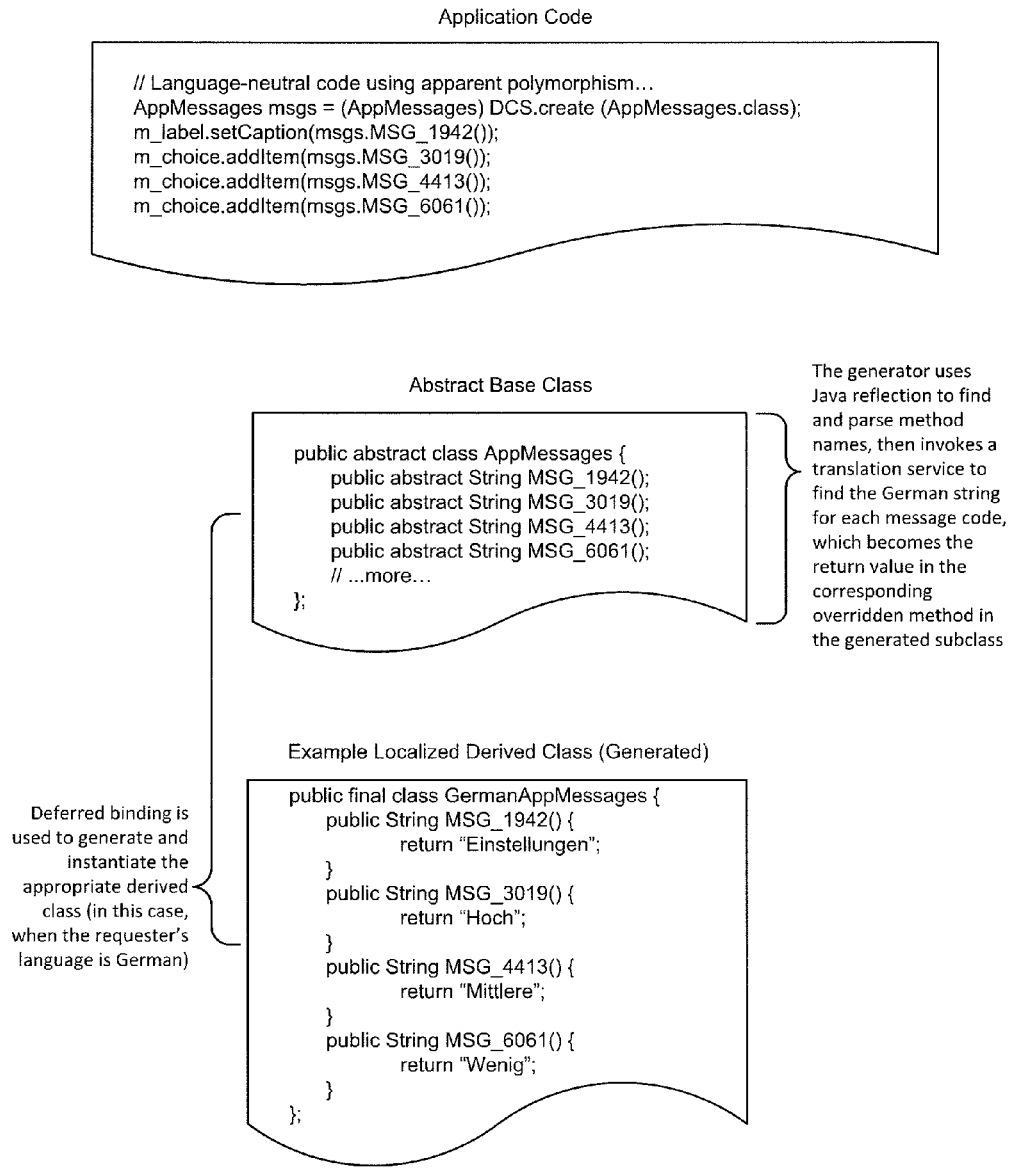
FIG. 5 is a diagram illustrating generator usage of context information in several ways.

Generators can use this context information in a variety of ways, including but not limited to (1) determining what to name the generated class, (2) determining how to access data that will be infused into the generated class (for example, providing a database "connection string"), and (3) using type interrogation techniques (for example, Java reflection) to examine the requested class for purposes such as (a) inferring how to generate the substitute class in a compatible way, such as knowing which methods to override and (b) allowing the contents of the requested class itself to affect code generation, such as by parsing code comments for metadata or by enumerating, parsing the names of, or invoking methods on an instance of the requested class. In other words, the requested class itself can guide the behavior of the generator. Such usage is illustrated in FIG. 5.

In one preferred implementation of the system, a deferred binding generator is used to automatically produce remote procedure call (RPC) proxies that are automatically integrated into the output program without programmer intervention. This approach is desirable because traditional RPC techniques require programmers to perform a separate, explicit step such as running a proxy/stub compiler to generate the required proxy and stub classes. The implementation referred to above uses Java reflection to examine a requested interface, analyzing the names, parameter types and return types of its methods to generate a substitute class that automatically performs the caller-side serialization of RPC calls as well as deserialization of RPC results.

One preferred implementation of the described system provides the ability to smoothly integrate portions of code written directly in the language of the output program (or in principle any other language) within the input program in a reasonably natural way, referred to herein as "native code integration." This facility follows the tradition of analogous techniques such as allowing inline assembly in C language source code. In one implementation that translates Java into JavaScript, for example, the ability to intertwine handwritten JavaScript into a Java class definition has proven very useful for writing low-level and/or performance-sensitive code. The ability to intermingle handwritten JavaScript with the system's generated output program (that is, generated JavaScript) in a structured way provides a productive and low-risk method of writing the lowest-level code required for the output program to work (that is, the kernel JavaScript code upon which the rest of the output program depends); FIG. 6 depicts an exemplary incorporation of native JavaScript code.

In addition, this facility may be open to use by any author of input programs so as to make it possible to create integration libraries and other tasks that necessitate bypassing the language of the input program and accessing concepts in the language of the output program directly. Examples of how this facility could be utilized include Java programming interfaces encapsulating JavaScript code to interface with browser-hosted ActiveX controls or other plug-ins such as Macromedia Flash as well as selectively writing critical algorithms in the language of the output program to improve performance or reduce size.

It is possible to create an implementation of the described system that combines one or more techniques described above in combination, namely (1) deferred binding code-generation, (2) native code integration, and/or (3) a hosted mode facility, to provide a uniquely productive environment. Using the example of Java input programs and JavaScript output programs, a hosted mode facility allows development and debugging of input programs using Java tools. A complication arises when native code integration is introduced in that a hosted mode Java environment does not understand JavaScript. In FIG. 6, for example, the handwritten JavaScript is in a Java comment and is completely stripped away when the Java input program is running in hosted mode. This would appear to limit the utility of hosted mode in cases where native code integration was required.

Deferred binding generators can solve this problem: a generator can be invoked to create a subclass on the fly in hosted mode for any class containing handwritten JavaScript that invokes a subsystem for injecting actual JavaScript into the process as it is running. Such a generator would examine the requested class to parse out the methods as well as the specially-formatted comments containing JavaScript. As an example of how this parsed JavaScript can be used in hosted mode, note that it is possible to create a Win32 DLL that is accessible via a Java Native Interface (JNI) library that hosts the Internet Explorer browser ActiveX control in a Win32 window; this JNI library provides access to the Internet Explorer "script" object that allows arbitrary JavaScript to be executed. The generated subclass, then, can use the JNI pass-through DLL to send JavaScript to Internet Explorer for execution without the hosted mode development system being aware of anything other than the Java language. In this example implementation, the combination of these fundamental techniques allows Java code to arbitrarily integrate JavaScript in a hosted mode environment. When an output program is produced that is completely JavaScript, the contents of the specially-formatted comment blocks (that is, the handwritten JavaScript) can be seamlessly emitted into the produced output program.

When possible, if the language of the output program supports exceptions or other ways of indicating errors, implementations of the described system may attempt to transparently integrate such error-handling mechanisms into the language of the input program. This prevents software developers from having to consider error-handling scenarios that occur in an output program in terms of mechanisms that are not present in the language of the input program. For illustration, Java input programs have an exception mechanism defined, while JavaScript output programs also have an exception mechanism defined that is different that the Java mechanism. The result is that code to handle exceptions in the Java input program is not necessarily sufficient to catch all exceptions that might occur in the JavaScript output program. One preferred implementation automatically generates special code in the output program that transforms unhandled JavaScript exceptions into a form that can be caught by the structures generated by the Java code written by the author of the input program. That is, a Java input program can be written to catch "RuntimeException" objects and any error that occurs while the JavaScript output program is running that is unique to JavaScript will be automatically caught and transformed into a RuntimeException object which can be caught. This technique unifies exception handling into the language of the input program, which greatly simplifies input program development.

Because the described system performs a translation of the input program to an equivalent output program, it has the opportunity to use "hints" from the input program to guide code generation and optimization. This ability may be of particular importance when certain aspects of the language of the input program are difficult or inefficient to implement in the language of the output program.

An example of this occurs in an implementation that produces JavaScript applications from Java applications. In the Java language, static class initialization code is always guaranteed to have been called before any static methods or fields are accessed. The structure of the Java language necessitates inserting many tests into the output program to ensure that any static initialization code is called before static members are accessed. Because size and speed are at a premium in the JavaScript language, it is preferable to avoid these tests. A preferred implementation of the system implements a "noinit" class modifier, which allows the generated code to ignore static initialization for the class that it modifies. Using this modifier on classes whose static methods and fields are accessed often makes a significant difference in performance.

The described system facilitates hierarchical caching of generated output programs. Such a design increases the speed at which the output program can be fetched and executed by the client component. The best outcome is that the Client Component itself can cache output programs, completely bypassing network fetches.

Figure 7:
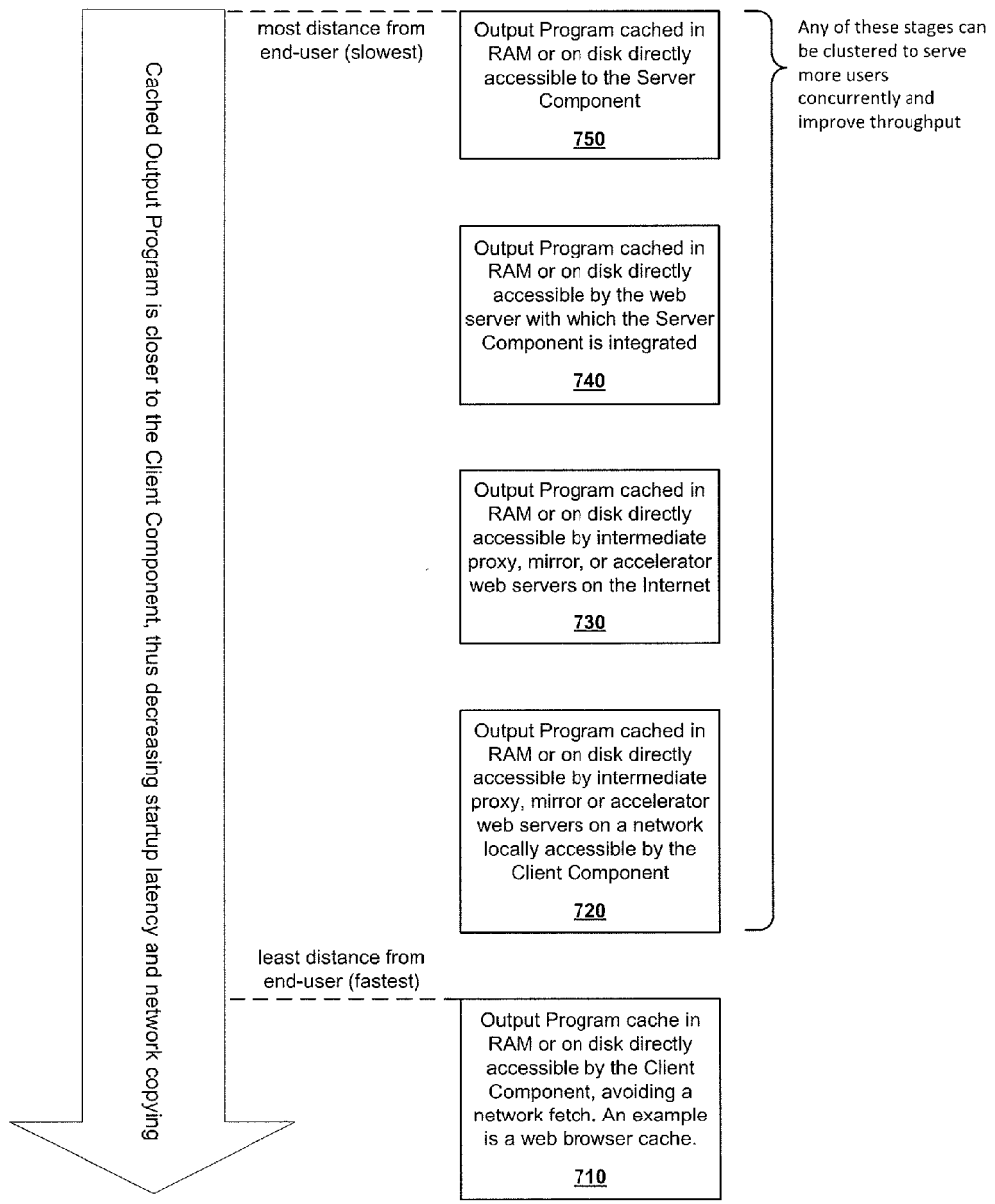
FIG. 7 shows the various stages at which output programs can be cached in a typical web-oriented implementation.

FIG. 7 shows the various stages at which output programs can be cached in a typical web-oriented implementation. At level 710, the least distance from the user, an output program is cached in a local data store such as RAM or disk directly accessible by a client component. At level 720, the output program is cached in a data store directly accessible by an intermediate proxy, mirror or accelerator web server on a local communication network accessible by the client component. At level 730, the output program is cached in a data store directly accessible by an intermediate proxy, a mirror or an accelerator web server on the Internet. At level 740, the output program is cached in a data store directly accessible by the web server with which the server component is integrated. At level 750, the output program is cached in a data store directly accessible by the server component. Any of levels 720, 730, 740 and/or 750 could be clustered in some implementations to serve more users concurrently and to improve throughput.

For a web-oriented implementation, and in particular one which produces full JavaScript output programs that manipulate the browser document object model (sometimes referred to as dynamic HTML or DHTML) as opposed to a series of individual HTML web pages, the described system is unique in that traditional web applications produce one page at a time such that each page intermingles HTML and data specific to that page. This inhibits aggressive hierarchical caching because, even though the HTML layout of the page may not change between requests, the data incorporated may, so the entire page must be recopied to each cache level. The mentioned web implementation, however, can eliminate such situation because the output program does not vary with the particular data that needs to be displayed. Thus, by separating the application user interface and related logic (that is, the output program) from the application data (which is fetched by the output program while it is running), changes to application data do not invalidated cached copies of the output program. This technique makes caching far more effective than traditional page-based caching.

Figure 8:
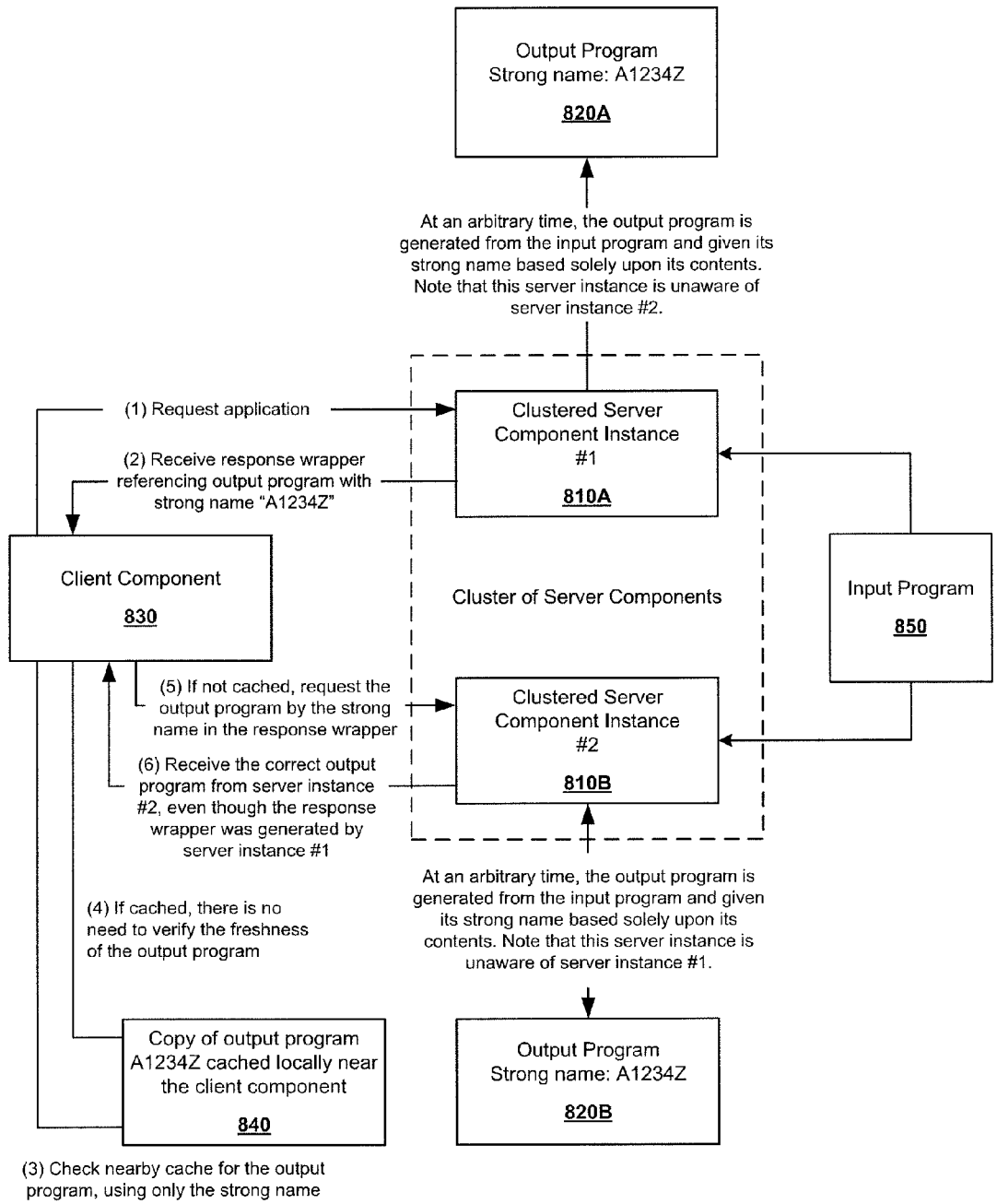
FIG. 8 depicts an exemplary naming and caching approach.

A complication that normally arises with hierarchical caching is the question of "freshness" of cached copies. How can intermediate caches recognize when their copies of output programs are out of date with respect to the authoritative version (that is, original versions produced directly by a server component)? In the worst case, every request requires a full round-trip back to the server component simply to ask the question "Is my copy out of date?" As illustrated in FIG. 8, the described system solves this dilemma by prescribing that every request for an output program is first answered with a small but uncacheable response (called the "response wrapper") that includes a reference to the actual output program 820. The output program is in turn named with a "strong name." The strong name is computed from the content of the output program itself. In a typical implementation, the strong name of an output program is an MD5 hash of all the bytes that constitute the output program, where the MD5 hash code has enough bit capacity to avoid hash code collisions over all reasonable-length output programs. Other techniques for generating strong names could of course be used so long as the net effect is that (1) no two output programs having different contents could possibly have the same strong name (and thus could not be confused with each other) and (2) identical copies of an output program always do have the same strong name.

The foregoing naming and caching methods solve two problems. First, intermediate caches need never check with the server component (810A, 810B) as to whether or not a cached copy of an output program (820A, 820B) is stale since the response wrapper comes directly from the server component and is uncacheable, and it is the response wrapper that dictates the strong name of the output program that the client component 830 should request. When the client component makes such a request based on the output program's strong name, any intermediate cache (e.g., local cache 840) that contains a copy having that strong name can be assured that it is up-to-date without double-checking with the server component and can thus immediately respond to the client component with its copy. Second, if server components are clustered, there is no guarantee that the server component instance that sends the response wrapper will be the same server component instance that receives the output program request. For example, some round-robin load balancers intentionally distributed requests to different server component instances. Thus, it is vital that output programs produced by different server component instances but from the same input program have the same strong names.

Preferred implementations of the described system whose output programs are web-accessible applications (for example, JavaScript and DHTML applications as described above) can incorporate a mechanism for monitoring software license compliance for one of more instances of the server component. As explained above in the discussion of caching behaviors, a web-oriented implementation will typically return a response wrapper that references the strong name of the appropriate output program. In this same response wrapper can be placed a highly unique but well-known identifier called a "license tag." A globally unique id ("GUID") is an appropriate form of license tag, although many other formulations of such a unique key are possible. The response wrapper also contains an encrypted version of the software license key of the server component that produced the response wrapper, called the "broadcast license". Since the response wrapper is produced first, when web-based search engines such as Google request a web application produced with the described system, they receive and store a copy of the response wrapper. (Typically they store a copy despite the response wrapper's uncacheable nature, although the server component may need to compensate by marking a response wrapper temporarily cacheable in the specific cases where a search engine, as opposed to a web browser, is requesting the application.) Thus, their search results database stores pages containing both the well-known license tag and the broadcast license. It is consequently possible to query said search engine for the well-known license tag to produce a list of cached response wrappers, each containing a broadcast license. By analyzing these cached response wrappers and their broadcast licenses, it is possible to identify duplicate software license keys, which can subsequently be used to identify unauthorized or unlicensed usage.

The server component license key is typically implemented as an encrypted block of information including information on the customer, serial number, licensed processor count, and so forth which can be decrypted and verified by a server component instance. An implementation should not broadcast the server license in the response wrapper in an un-encoded form, as it would be very easy for others to copy license keys and use without authorization. Thus, a preferred implementation of the server component encrypts the license key using a different public key suitable for cryptography such that only the implementer of the server component (typically a software vendor) would have the necessary private key to decrypt the broadcast license back into the issued license, allowing a vendor who so chooses to begin a trail of investigation to identify unauthorized copying of license keys.

Exemplary systems and methods have been described in detail. As used in the description, the meaning of "a," "an," and "the" includes plural reference unless the context clearly dictates otherwise. Also, as used in the description, the meaning of "in" includes "in" and "on" unless the context clearly dictates otherwise. Finally, as used in the description, the meanings of "and" and "or" include both the conjunctive and disjunctive and may be used interchangeably unless the context clearly dictates otherwise; the phrase "exclusive or" may be used to indicate situation where only the disjunctive meaning may apply.

The hardware of a typical execution environment for one or more of the components supporting the application development, composition and deployment function of the described systems and methods may include a system processor potentially including multiple processing elements, that may be distributed across the hardware components, where each processing element may be supported via a general purpose processor such as Intel-compatible processor platforms preferably using at least one PENTIUM class or CELERON class (Intel Corp., Santa Clara, Calif.) processor; alternative processors such as UltraSPARC (Sun Microsystems, Palo Alto, Calif.) and IBM zSeries class processors could be used in other embodiments, it is expected that future processors will be supported by the various implementations. In some embodiments, application development, composition and deployment, as further described below and in the incorporated documents, may be distributed across multiple processing elements. The term processing element may refer to (1) a process running on a particular piece, or across particular pieces, of hardware, (2) a particular piece of hardware, or either (1) or (2) as the context allows.

Some implementations can include one or more limited special purpose processors such as a digital signal processor (DSP), application specific integrated circuits (ASIC) or a field programmable gate arrays (FPGA). Further, some implementations can use combinations of general purpose and special purpose processors.

The hardware further includes a system data store (SDS) that could include a variety of primary and secondary storage elements. In one preferred embodiment, the SDS would include RAM as part of the primary storage. The primary storage may in some embodiments include other forms of memory such as cache memory, registers, non-volatile memory (e.g., FLASH, ROM, EPROM, etc.), etc.

The SDS may also include secondary storage including single, multiple and/or varied servers and storage elements. For example, the SDS may use internal storage devices connected to the system processor. In embodiments where a single processing element supports all of the system functionality a local hard disk drive may serve as the secondary storage of the SDS, and a disk operating system executing on such a single processing element may act as a data server receiving and servicing data requests.

It will be understood by those skilled in the art that the different information used in the systems and methods disclosed herein may be logically or physically segregated within a single device serving as secondary storage for the SDS; multiple related data stores accessible through a unified management system, which together serve as the SDS; or multiple independent data stores individually accessible through disparate management systems, which may in some embodiments be collectively viewed as the SDS. The various storage elements that comprise the physical architecture of the SDS may be centrally located or distributed across a variety of diverse locations.

The architecture of the secondary storage of the system data store may vary significantly in different embodiments. In several embodiments, database(s) are used to store and manipulate the data; in some such embodiments, one or more relational database management systems, such as DB2 (IBM, White Plains, N.Y.), SQL Server (Microsoft, Redmond, Wash.), ACCESS (Microsoft, Redmond, Wash.), ORACLE 8i (Oracle Corp., Redwood Shores, Calif.), Ingres (Computer Associates, Islandia, N.Y.), MySQL (MySQL AB, Sweden) or Adaptive Server Enterprise (Sybase Inc., Emeryville, Calif.), may be used in connection with a variety of storage devices/file servers that may include one or more standard magnetic and/or optical disk drives using any appropriate interface including, without limitation, IDE and SCSI. In some embodiments, a tape library such as Exabyte X80 (Exabyte Corporation, Boulder, Colo.), a storage attached network (SAN) solution such as available from (EMC, Inc., Hopkinton, Mass.), a network attached storage (NAS) solution such as a NetApp Filer 740 (Network Appliances, Sunnyvale, Calif.), or combinations thereof may be used. In other embodiments, the data store may use database systems with other architectures such as object-oriented, spatial, object-relational or hierarchical.

Instead of, or in addition to, those organization approaches discussed above, certain embodiments may use other storage implementations such as hash tables or flat files or combinations of such architectures. Such alternative approaches may use data servers other than database management systems such as a hash table look-up server, procedure and/or process and/or a flat file retrieval server, procedure and/or process. Further, the SDS may use a combination of any of such approaches in organizing its secondary storage architecture.

The hardware components may each have an appropriate operating system such as WINDOWS/NT, WINDOWS 2000 or WINDOWS/XP Server (Microsoft, Redmond, Wash.), Solaris (Sun Microsystems, Palo Alto, Calif.), or LINUX (or other UNIX variant). Depending upon the hardware/operating system platform of the overall environment, Web server functionality may be provided via an Internet Information Server (Microsoft, Redmond, Wash.), an Apache HTTP Server (Apache Software Foundation, Forest Hill, Md.), an iPlanet Web Server (iPlanet E-Commerce Solutions—A Sun—Netscape Alliance, Mountain View, Calif.) or other suitable Web server platform. Browser software can communicate with such server software according to the methods described above.

The embodiments described above, and in the documents incorporated herein, are given as illustrative examples only. It will be readily appreciated by those skilled in the art that many deviations may be made from the specific embodiments disclosed in this specification without departing from the invention as claimed below.

What is claimed is:

1. A computer implemented method of verifying license compliance for a web application, the method comprising:
generating an uncacheable response wrapper including a broadcast license and a license tag in response to request for a web application;
making the web application available for review by a web search engine by temporarily making the response wrapper cacheable if the request for the web application is received from a search engine;
communicating a query to the web search engine for a selected license tag;
receiving, in response to the communicated query, a list of a plurality of reviewed web applications whose generated response wrapper included the selected license tag from the web search engine;
evaluating a plurality of broadcast licenses associated with the plurality of reviewed web applications to identify duplicate broadcast licenses; and
reporting duplicate broadcast licenses among the reviewed web pages.

2. The method of claim 1, further comprising generating the license tag of the web application.

3. The method of claim 2, wherein generating the license tag comprises assigning a globally unique identifier.

4. The method of claim 1, further comprising generating the broadcast license.

5. The method of claim 4, wherein generating the broadcast license comprises:
retrieving a raw key;
applying a symmetric encryption to the raw key to generate a user key; and
applying a symmetric encryption to the user key to generate the broadcast license.

6. The method of claim 5, wherein retrieving a raw key comprises generating the raw key based upon information associated with a user.

7. The method of claim 6, wherein generating the raw key is based upon information associated with a licensed hardware platform.

8. At least one computer readable non-transitory medium storing instructions that, when executed by a computer, cause the computer to execute the method of claim 1.

9. A computer implemented method of verifying license compliance for a web application, the method comprising:
creating a web application that generates an uncacheable response wrapper including a broadcast license and a license tag in response to receiving a request for the web application from a web browser and generates a temporarily cacheable response wrapper including a broadcast license and a license tag in response to receiving a request for the web application from a search engine;
querying a search engine for a selected license tag;
receiving results from the queried search engine;
generating a list of a plurality of reviewed web pages based upon the results from the search engine;
evaluating a plurality of broadcast licenses associated with the plurality of reviewed web pages to identify duplicate broadcast licenses; and
reporting duplicate broadcast licenses among the reviewed web pages.

10. The method of claim 9, further comprising generating the broadcast license of the web application.

11. The method of claim 9, further comprising generating the license tag of the web application.

12. The method of claim 11, wherein generating the license tag comprises assigning a globally unique identifier.

13. The method of claim 9, wherein each reviewed web page includes the web application whose generated response wrapper includes the selected license tag.

14. At least one computer readable non-transitory medium storing instructions that, when executed by a computer, cause the computer to execute the method of claim 9.

15. A system for verifying license compliance for a web application, the system comprising:
a data store to store a broadcast license and a license tag associated with a web application;
a communication interface to support communication with a search engine or a web browser; and
a processor to:
generate an uncacheable response wrapper including a broadcast license and a license tag in response to receipt of a request for a web application from a web browser and generate a temporarily cacheable response wrapper including a broadcast license and a license tag in response to receiving a request for a web application from a search engine;
communicate a query for a selected license tag to a selected search engine via the communication interface;
receive results from the communicated query;
generate a list of reviewed web pages based upon the results, each reviewed web page including a selected web application whose generated response wrapper includes the selected license tag;
evaluate broadcast licenses associated with the reviewed web pages to identify duplicate broadcast licenses; and
report duplicate broadcast licenses among the reviewed web pages.

* * * * *